US00RE43572E

(19) United States
(12) Reissued Patent
West

(10) Patent Number: US RE43,572 E
(45) Date of Reissued Patent: Aug. 14, 2012

(54) BI-DIRECTIONAL MULTI-PORT INVERTER WITH HIGH FREQUENCY LINK TRANSFORMER

(75) Inventor: Richard T. West, Ragged Point, CA (US)

(73) Assignee: Xantrex Technology, Inc., Arlington, WA (US)

(21) Appl. No.: 12/857,250

(22) Filed: Aug. 16, 2010

Related U.S. Patent Documents

Reissue of:
(64) Patent No.: 7,102,251
Issued: Sep. 5, 2006
Appl. No.: 10/604,876
Filed: Aug. 22, 2003

U.S. Applications:
(62) Division of application No. 12/205,743, filed on Sep. 5, 2008, now Pat. No. Re. 41,965.

(51) Int. Cl.
*H02J 1/00* (2006.01)
*H02J 9/00* (2006.01)
*H02J 7/00* (2006.01)

(52) U.S. Cl. ..... 307/64; 307/66; 307/72; 307/82; 363/16; 363/97

(58) Field of Classification Search ..... 307/64, 307/66, 82, 72; 363/16, 97, 37, 55, 71
See application file for complete search history.

(56) References Cited

U.S. PATENT DOCUMENTS

| | | | | |
|---|---|---|---|---|
| 4,947,311 | A | 8/1990 | Peterson | |
| 5,017,800 | A | 5/1991 | Divan | |
| 5,029,064 | A | 7/1991 | Ball | |
| 5,856,712 | A | 1/1999 | Suzuki et al. | |
| 6,175,510 | B1 | 1/2001 | Loh | |
| 6,198,177 | B1 * | 3/2001 | Mao et al. | 307/66 |
| 6,246,592 | B1 | 6/2001 | Balogh et al. | |
| 6,429,546 | B1 | 8/2002 | Ropp et al. | |
| 6,650,552 | B2 | 11/2003 | Takagi et al. | |
| 7,449,798 | B2 | 11/2008 | Suzuki et al. | |
| 2001/0010637 | A1 | 8/2001 | Schlecht | |
| 2002/0190698 | A1 * | 12/2002 | Smidt et al. | 323/222 |
| 2003/0006737 | A1 * | 1/2003 | LaFollette et al. | 320/137 |
| 2003/0012038 | A1 | 1/2003 | Welches et al. | |
| 2003/0027839 | A1 * | 2/2003 | Palmer et al. | 514/312 |
| 2003/0206424 | A1 * | 11/2003 | Jungreis et al. | 363/125 |
| 2004/0004402 | A1 | 1/2004 | Kippley | |
| 2004/0027839 | A1 | 2/2004 | Deng et al. | |
| 2004/0070944 | A1 | 4/2004 | Wells et al. | |
| 2004/0165408 | A1 | 8/2004 | West et al. | |
| 2005/0078491 | A1 | 4/2005 | Song et al. | |
| 2005/0226017 | A1 | 10/2005 | Kotsopoulos et al. | |

* cited by examiner

*Primary Examiner* — Daniel Cavallari
(74) *Attorney, Agent, or Firm* — Nixon Peabody LLP

(57) ABSTRACT

This invention is a multi-port power converter where all ports are coupled through different windings of a high frequency transformer. Two or more, and typically all, ports have synchronized switching elements to allow the use of a high frequency transformer. This concept and type of converter is known. This invention mitigates a number of limitations in the present art and adds new capabilities that will allow applications to be served that would otherwise not have been practical. A novel circuit topology for a four-quadrant AC port is disclosed. A novel circuit topology for a unidirectional DC port with voltage boost capabilities is disclosed. A novel circuit topology for a unidirectional DC port with voltage buck capabilities is disclosed. A novel circuit for a high efficiency, high frequency, bi-directional, AC semiconductor switch is also disclosed.

9 Claims, 8 Drawing Sheets

BI-DIRECTIONAL MULTI-PORT INVERTER WITH HIGH FREQUENCY LINK TRANSFORMER

Matter enclosed in heavy brackets [ ] appears in the original patent but forms no part of this reissue specification; matter printed in italics indicates the additions made by reissue.

*CROSS REFERENCE TO RELATED APPLICATIONS*

*More than one reissue application has been filed for U.S. Pat. No. 7,102,251. This application is a divisional reissue application of prior U.S. patent Reissue application Ser. No. 12/205,743, titled "Bi-Directional Multi-Port Inverter With High Frequency Link Transformer" and filed on Sep. 5, 2008, which is a reissue application of U.S. Pat. No. 7,102,251, which are incorporated herein by reference in their entirety.*

BACKGROUND OF INVENTION

The field of this invention is power electronics and electrical power conversion. Electronic power inverters are devices for converting direct current (DC) power, usually from a storage battery, into alternating current (AC) power for household appliances. Some inverters also convert power from an AC source to charge the storage battery used by the inverter. Devices capable of power transfer in either direction, DC-to-AC or AC-to-DC are commonly referred to as inverter/chargers or bi-directional inverters. Inverters are also used in renewable and distributed energy systems to convert DC power from photovoltaic panels, fuel cells or wind turbines into power that can be delivered into the utility grid. There is a growing demand for an inverter product with this capability that can also charge storage batteries and support AC loads when the utility grid is not available. Residential systems with both renewable energy sources and energy storage components typically use a battery-centric topology. This is because the battery provides a stable voltage and high peak power capabilities. In these systems, the renewable energy source interfaces to the battery through a DC-to-DC converter or charge controller to provide the required matching and regulation functions. The battery is in turn connected to a DC-to-AC inverter, to support the system loads, and to a battery charger. Additional energy sources as well as DC loads would also logically tie in at the storage battery connection point. With the present state of technology, this arrangement typically provides the most cost effective and highest performance system solution. There are a number of inherent limitations with this approach. (i) The storage battery voltages are relatively low compared to the AC voltages that the inverter produces. A common power conversion method is to convert the low DC battery voltage into a low AC voltage and then use a transformer to convert to a higher AC voltage. This approach requires a heavy, expensive, and typically inefficient, low frequency transformer. (ii) The conversion efficiency from the renewable energy source to the battery to the utility grid is low because of the additive losses from each successive power conversion stage. (iii) Higher voltage, higher efficiency, lower cost photovoltaic series "string" arrays are not practical because of the photovoltaic/battery voltage disparity. (iv) Individual power converters in battery-centric systems are usually autonomous. It is advantageous for all power converters to act in concert in order to achieve optimum battery life and to better support the system loads.

SUMMARY OF INVENTION

The invention is a multi-port power electronics topology, with a high frequency transformer as the common power "conduit" and interface point for all ports. This invention would allow for energy systems that are high-frequency-transformer-core-centric as opposed to battery-centric. This invention mitigates essentially all of the limitations of battery-centric energy systems. The underlying power converter concept used for this invention was originally invented by William McMurry and disclosed in U.S. Pat. No. 3,517,300 in 1970. Since then, others have expanded the potential capabilities of these power converters but with less-than-novel or with technically obvious variations on the original McMurry invention. The invention disclosed herein involves a number of novel power circuit topologies that allow much greater port flexibility and provide enhanced performance. The invention allows a port to perform as a boost or buck converter when sourcing power into the high frequency transformer, a capability that has not been previously established. These added capabilities allow applications to be served that would otherwise not have been practical. Also, the invention allows each non-battery port to "see" only the reflected battery characteristics at the transformer interface so that the operation of all non-battery ports are independent and non-interactive. The preferred embodiment of the invention is intended for residential electrical energy systems. There are three ports; a bi-directional battery port that allows a storage battery to source energy to the transformer or sink energy from the transformer to charge the battery, a bi-directional AC port that allows the transformer to source energy to loads and also to sink or source energy from a utility grid at unity power factor, and a renewable energy port that sources energy into the transformer and is capable of controlling the operating point of the renewable energy source and the amount of power delivered into the transformer. Products developed using this invention will be (i) lighter because transformers operating at ultrasonic frequencies are much smaller than line frequency transformers (ii) lower cost because of the smaller transformer and the system-integrated power conversion approach and (iii) more efficient because of fewer power conversion stages and the lower core and copper losses associated with high frequency transformers. These advantages are had without sacrificing the isolation properties of a transformer.

DETAILED DESCRIPTION

Figure 1:
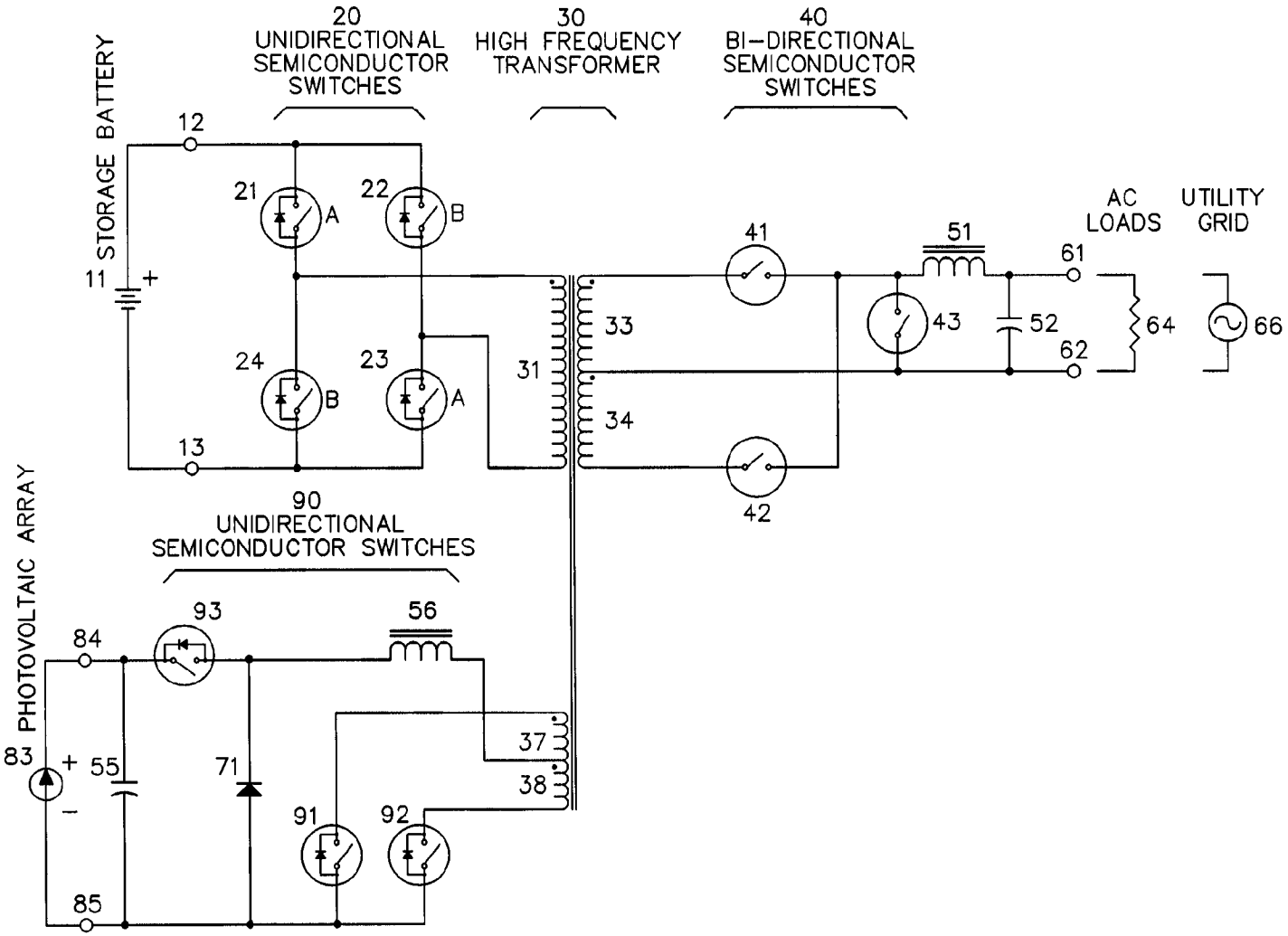
FIG. 1 illustrates the preferred embodiment of the invention, a power converter for residential energy systems having a photovoltaic (PV) array, a storage battery and a multipurpose utility/load/generator interface.
Figure 2:
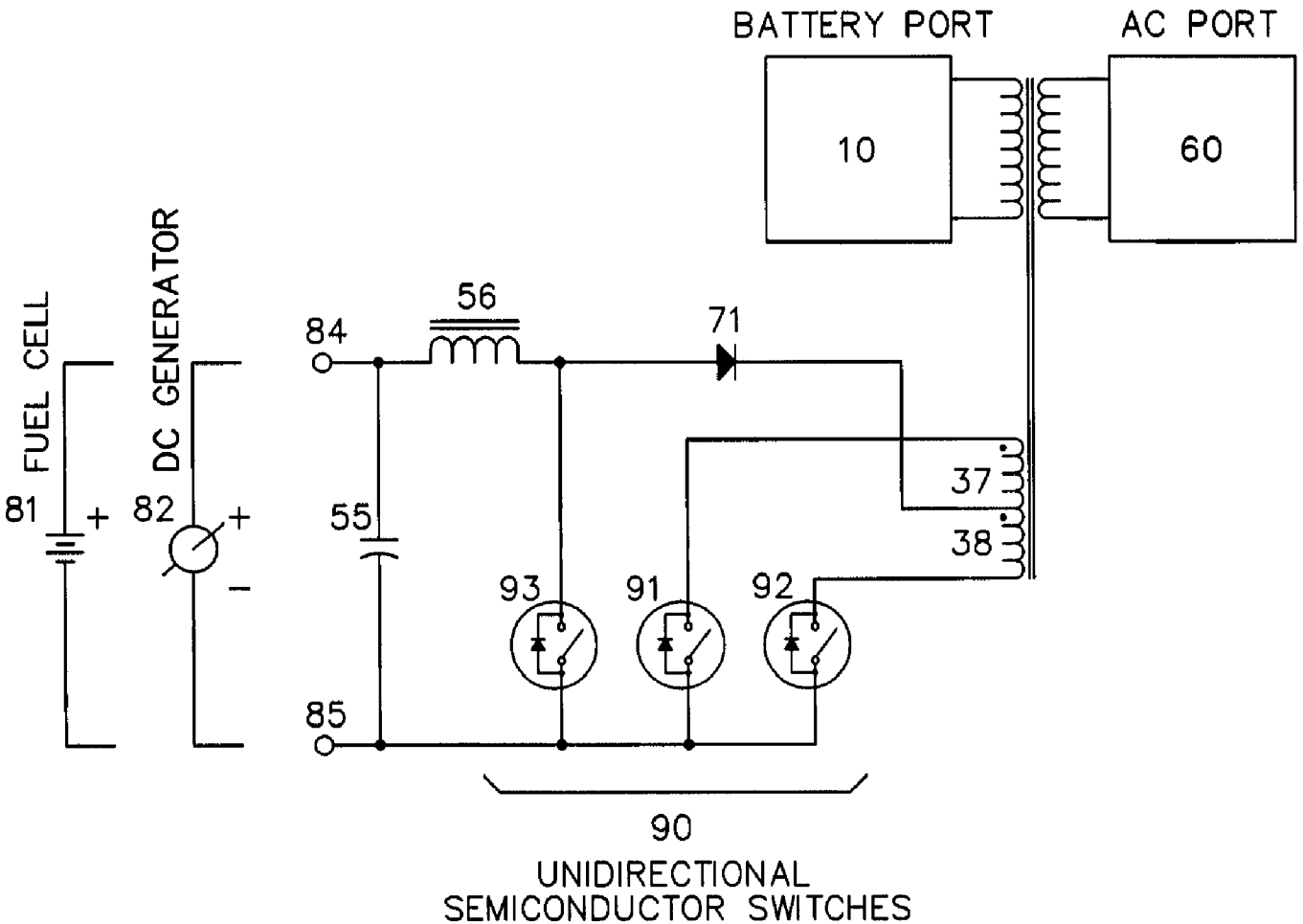
FIG. 2 illustrates an alternate power converter circuit topology for residential energy systems having a renewable energy source, a storage battery and a multipurpose utility/load/generator interface.
Figure 3A:
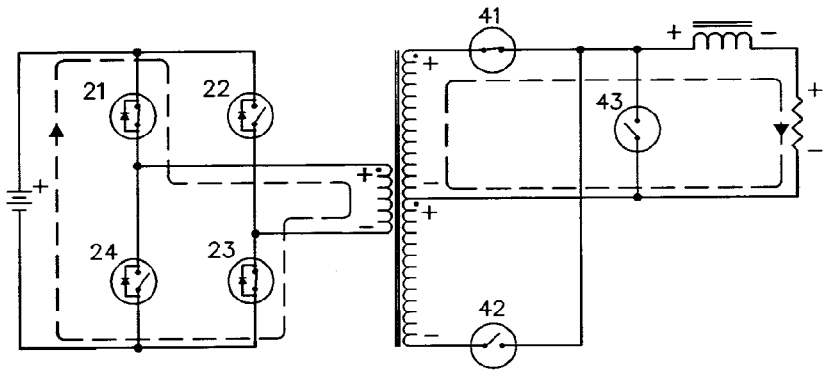
FIG. 3 illustrates the sequence of high frequency switch closures in a two-port power converter using the invention. The condition shown is a battery at the two-quadrant DC port delivering power to a load at the four-quadrant AC port.
Figure 3B:
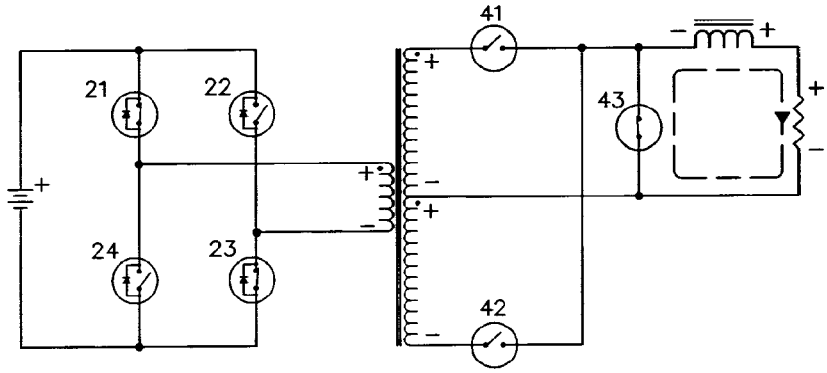
Figure 3C:
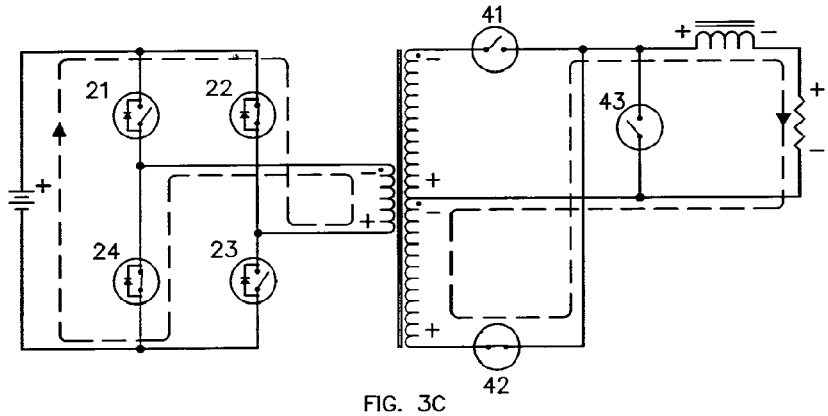
Figure 3D:
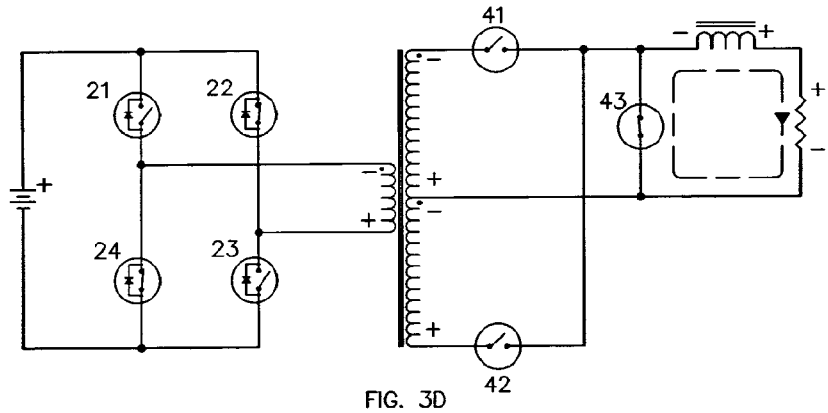
Figure 4A:
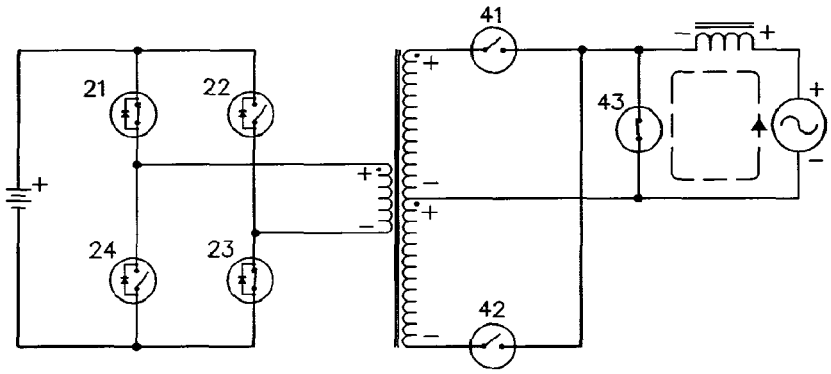
FIG. 4 illustrates the sequence of high frequency switch closures in a two-port power converter using the invention. The condition shown is an AC voltage source at the four-quadrant AC port delivering power to (charging) the battery at the two-quadrant DC port.
Figure 4B:
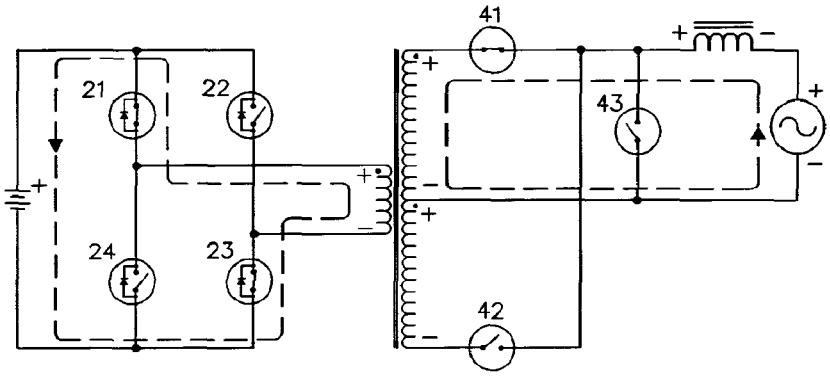
Figure 4C:
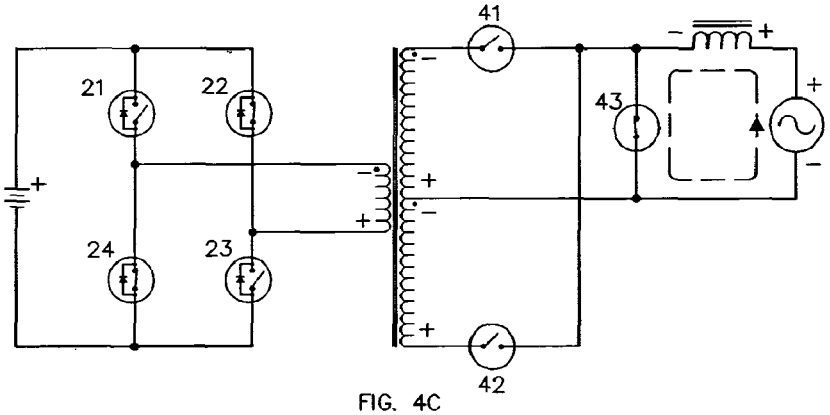
Figure 4D:
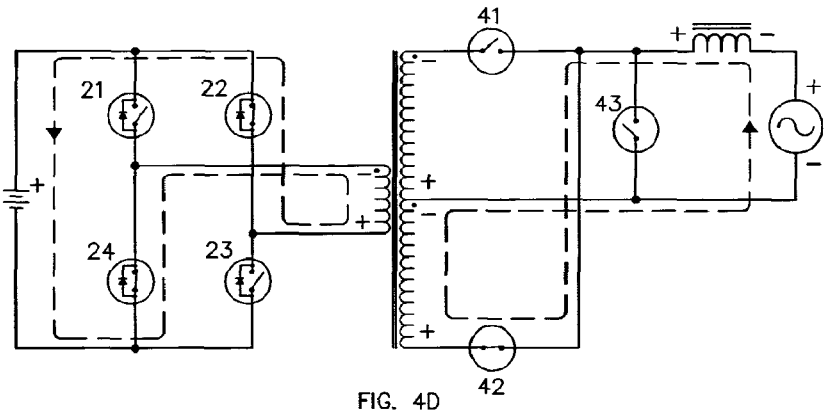
Figure 5:
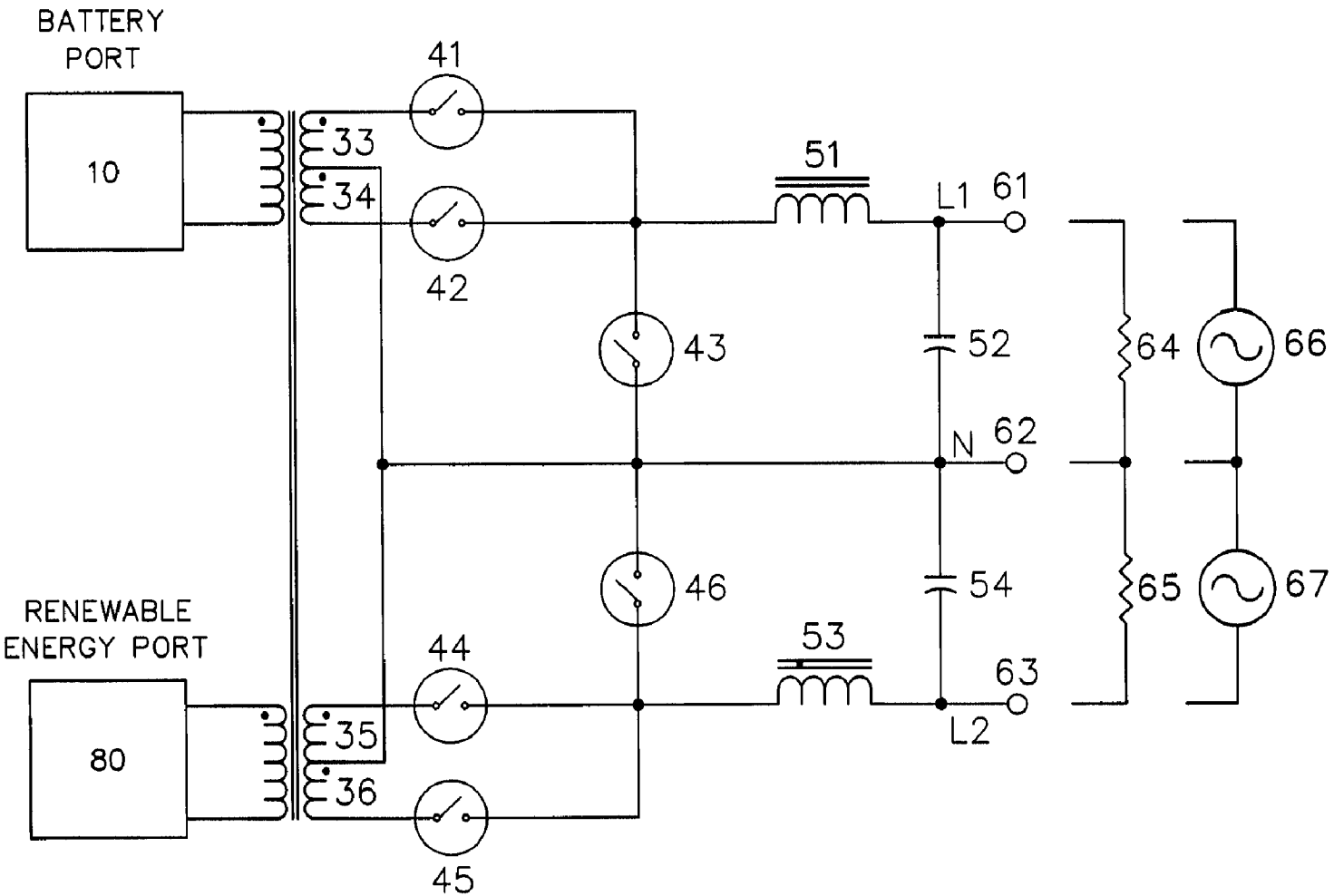
FIG. 5 illustrates an alternate power converter topology for residential energy systems having a renewable energy source, a storage battery and a split-phase, multipurpose, utility/load/generator interface.
Figure 6:
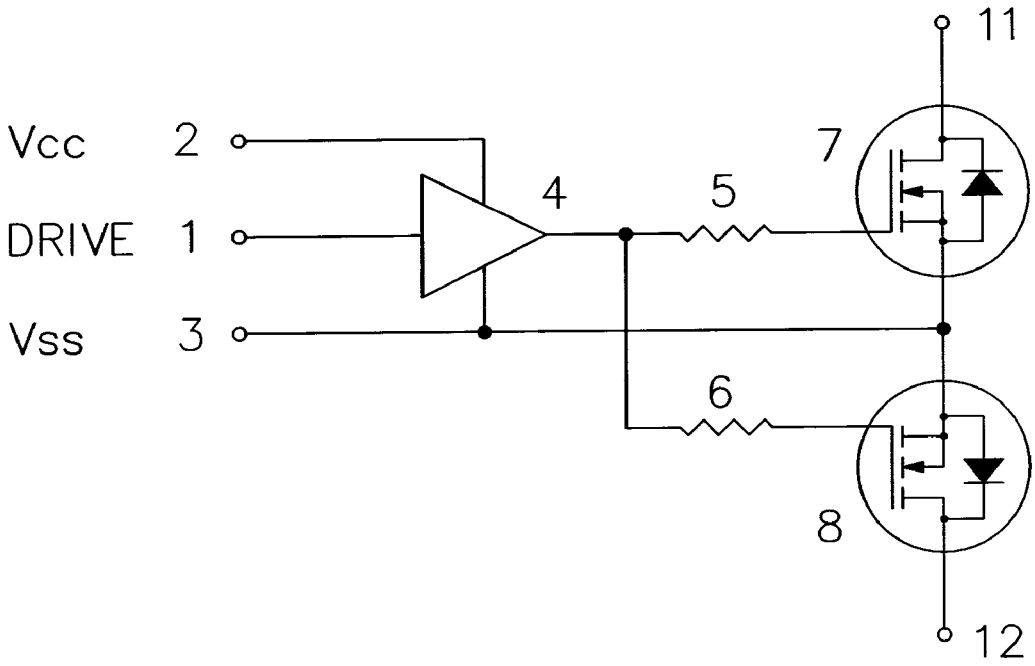
FIG. 6 illustrates a typical, known bi-directional semiconductor switch capable of bipolar voltage blocking, bi-directional current control and bi-directional current conduction.
Figure 7:
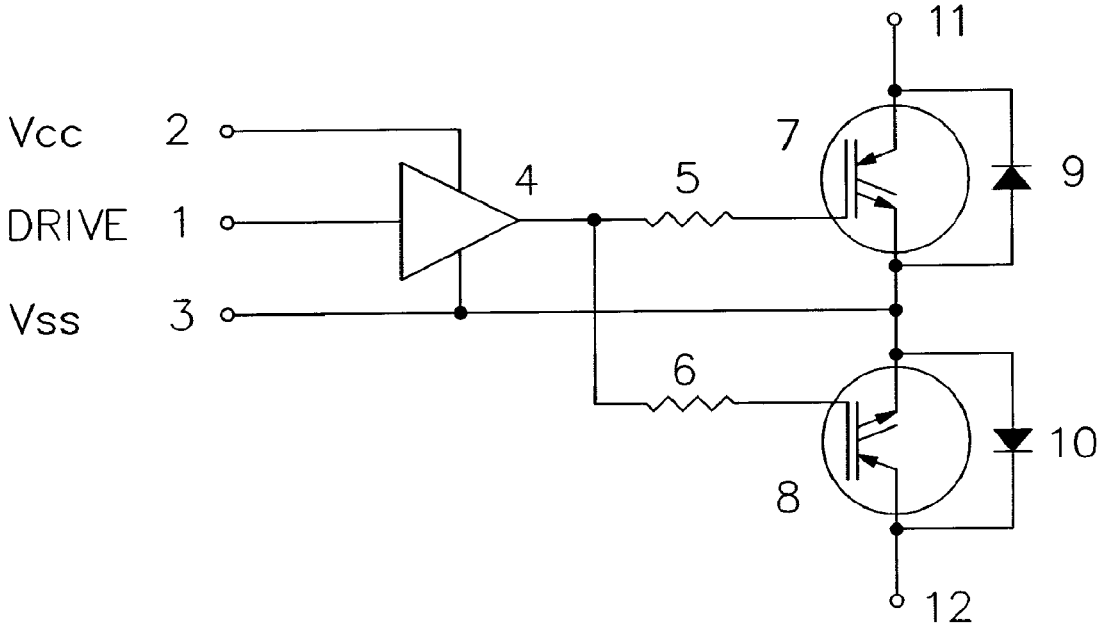
FIG. 7 illustrates an alternate, bi-directional semiconductor switch capable of bipolar voltage blocking, bi-directional current control and bi-directional current conduction using IGBT instead of MOSFET devices.
Figure 8:
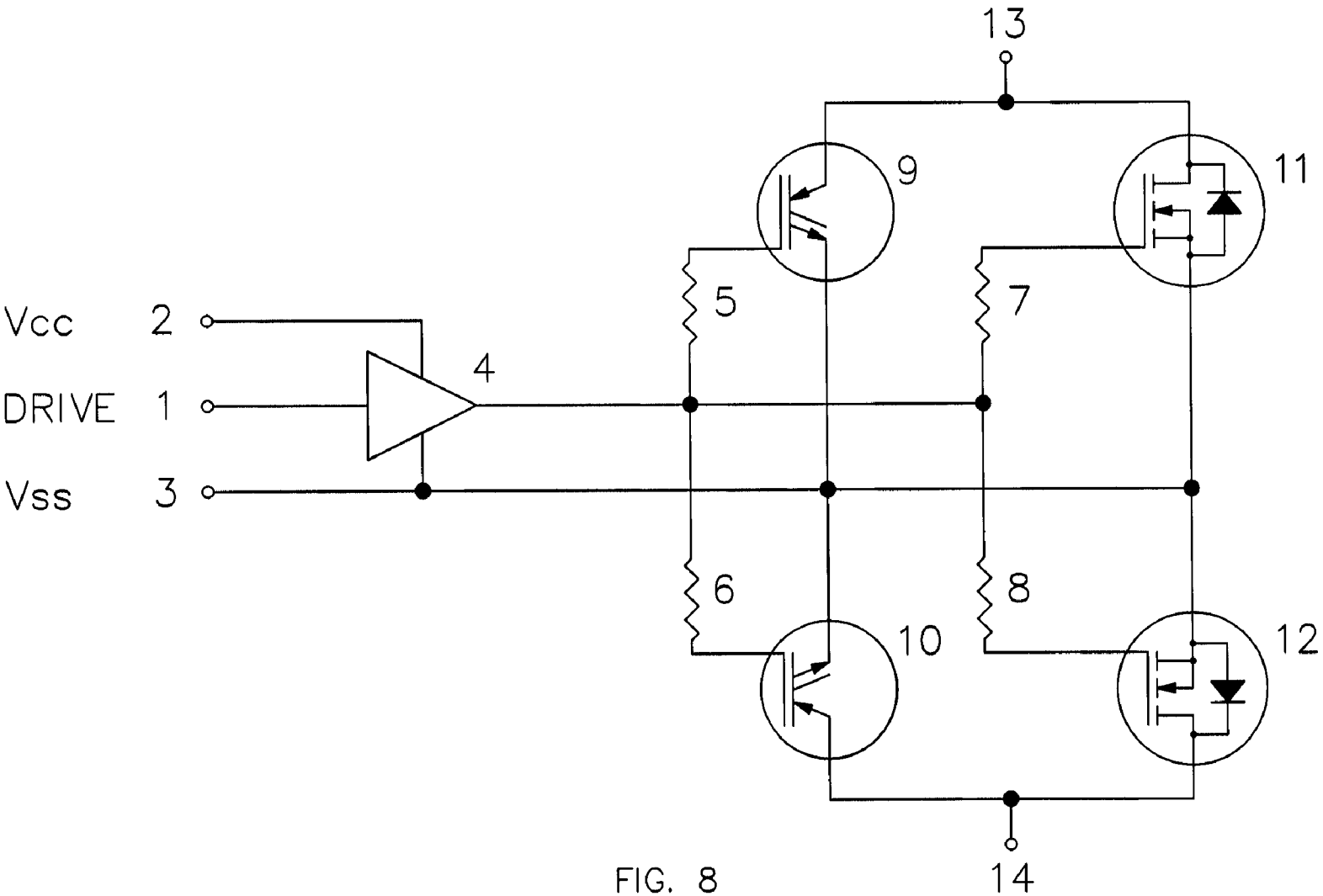
FIG. 8 illustrates a novel, composite, bi-directional semiconductor switch capable of bipolar voltage blocking, bi-directional current control and bi-directional current conduction.

FIG. 1 illustrates the preferred embodiment of the invention, a three-port power converter topology with one bi-directional battery port, at terminals 12 and 13, one four-quadrant AC port, at terminals 61 and 62, and one unidirectional renewable energy port at terminals 84 and 85. Two types of semiconductor switch elements are shown. Switches 21–24 and 91–93 have unipolar voltage blocking, unidirectional current control and bi-directional current conduction capabilities and are referred to as unidirectional semiconductor switches on all diagrams. Switches 41–43 have bipolar voltage blocking, bi-directional current control and bi-directional current conduction capabilities and are referred to as bi-directional switches in all diagrams. The battery port, at terminals 12 and 13, contains a typical, full-bridge arrangement of power switches 21–24 and is connected to winding 31 of high frequency transformer 30. Switch pairs 21, 23 and 22, 24 are alternately closed and opened at a high rate, typically greater than 20 kHz, providing the transformer with square wave excitation from a relatively low impedance source. The switching is free running and the duty cycle remains fixed at 50%. The AC port, at terminals 61 and 62, contains a typical center-tapped, half-bridge switch topology using bi-directional semiconductor switches 41 and 42. Switches 41 and 42 are always operated synchronously with switch pairs 21, 23 and 22, 24 to basically unfold the high frequency AC square wave on windings 33 and 34. The flux in transformer 30 is always reversed at the switching frequency of bridge 20. Unlike switch pairs 21, 23 and 22, 24, switches 41 and 42 will operate at duty cycles from zero to 50%, as commanded by a control circuit, to provide the desired current or voltage regulation for the AC port. The inclusion of switch 43 allows the AC port to act as a boost circuit in, conjunction with inductor 51, when delivering energy from utility grid 66 to high-frequency transformer 30. Switch 43 also allows an efficient path for freewheeling inductor current when power is being delivered from transformer 30 to AC loads 64 or utility grid 66. Without switch 43, a limited boost function can be had by simultaneously closing switches 41 and 42, causing transformer windings 33 and 34 to be short-circuited, and opening all bridge 20 switches. This works well for two-port converters but limits the transformer availability for converters with three or more ports because the transformer is unable to sink or source power at any port when windings 33 and 34 are shorted. Also, anytime bridge 20 is not in conduction, the operation of one port becomes dependent on the operation of other ports and the value of this power conversion approach is severely compromised. The inclusion and function of switch 43 in the AC port is novel and part of this invention. It should be noted that if power is flowing into the AC port, inductor 51 acts as a boost inductor, if power is flowing out of the AC port, inductor 51 acts as a filter component in conjunction with capacitor 52. The renewable energy port, at terminals 84 and 85, provides the ability for the converter to track the maximum power point of photovoltaic (PV) array 83 under various ambient conditions. The basic function of the port is that of a buck regulator. Energy from PV array 83 is stored in capacitor 55. Unidirectional switch 93 is turned on and off at a rate typically greater than 20 kHz and with a duty cycle established by a control circuit to regulate the PV voltage and/or power. When switch 93 is closed, diode 71 is back-biased and current flows through [boost] inductor 56 and returns through either transformer winding 37 and unidirectional switch 91 or through transformer winding 38 and unidirectional switch 92. When PV energy is available, switches 91 and 92 always operate at 50% duty cycle and in tandem with switch pairs 22, 24 and 21, 23 respectively. When switch 93 is opened, the freewheeling inductor current is conducted through diode 71 and either transformer winding 37 and unidirectional switch 91 or transformer winding 38 and unidirectional switch 92, whichever path is active at the time. The three-switch buck port topology described here is novel and is part of this invention. FIG. 2 illustrates an alternate topology for the renewable energy port, at terminals 84 and 85. The basic function of the port is that of a boost regulator. In the preferred embodiment, the renewable energy source is either fuel cell 81 or DC generator 82. Energy from the renewable source is stored in capacitor 55. Unidirectional switch 93 is turned on and off at a rate typically greater than 20 kHz and with a duty cycle established by a control circuit to regulate the port voltage and/or power. When switch 93 is closed, current flows from capacitor 55 to charge inductor 56. When switch 93 is opened, the current flowing in inductor 56 is conducted through diode 71 and either transformer winding 37 and unidirectional switch 91 or transformer winding 38 and unidirectional switch 92, whichever path is active at the time. Switches 91 and 92 operate at 50% duty cycle and in tandem with switch pairs 22, 24 and 21, 23 respectively, but may also be switched off when switch 93 is on. The three-switch boost port topology described is novel and is part of this invention. FIG. 3 illustrates one method of synchronizing the battery port and AC port switching elements to convert power from a storage battery to supply household AC loads. In this mode, AC voltage is regulated across the load. Regulation methodologies are known and typically use voltage and current feedback, reference values and error amplifiers to implement a fast inner current control loop and a slower outer AC voltage regulation loop. FIG. 3 illustrates the sequence of a complete high frequency switching cycle at point in time where a small portion of the positive voltage half-sine across the load is being created. In FIG. 3A, switch 41 is closed simultaneously with bridge pair 21, 23 causing current to flow out of the battery and into the load in the direction shown. In FIG. 3B, switch 41 is opened, interrupting the current flow from the battery, and at the same time switch 43 is closed. Switch 43 acts as a freewheeling diode to provide a path for the inductor current. In FIG. 3C, bridge pair 21, 23 are opened and bridge pair 22, 24 is closed, at the same time switch 43 is opened and switch 42 is closed. Current still flows through the load in the same intended direction even though the flux in the transformer has reversed. In FIG. 3D, switch 42 is opened, interrupting the current flow from the battery and at the same time switch 43 is closed, again providing a path for the inductor current. The sequence is then repeated 3A, 3B, 3C, 3D, 3A, etc. The ratio of switch 41 and 42 "on" times to the switching period controls the amount of energy transferred and is effectively the PWM duty cycle controlled by the regulator. The selection of switch 41 verses 42 controls the polarity of the voltage delivered to the load. The alternation of switch pairs 21, 23 and 22, 24 at high frequencies enable the use of a high frequency transformer. FIG. 4 illustrates one method of synchronizing the battery port and AC port switching elements to convert power from the AC utility grid to charge the storage battery. In this mode, AC current is sourced from the utility grid at unity power factor. The amplitude of the sine wave current out of the utility is proportional to the instantaneous battery charge current commanded by the system controller's charge algorithm. Regulation methodologies are known and typically use voltage and current feedback, reference values and error amplifiers to implement a current control loop with a sinusoidal current reference that is synchronous with the AC line voltage. FIG. 4 illustrates the sequence of a complete high frequency switching cycle at point in time where a small portion of a positive current half-sine is being sourced from the utility grid. In FIG. 4A, switch 43 is closed and the inductor charges from the instantaneous utility line voltage. Bridge pair 21, 23 is closed but the states of the bridge pairs are irrelevant because switches 41 and 42 are both open. In FIG. 4B, switch 43 is opened and switch 41 is simultaneously closed. The inductor current flows into the transformer. In FIG. 4C, bridge pair 21, 23 are opened and bridge pair 22, 24 is closed, at the same time switch 41 is opened and switch 43 is closed, charging the inductor. In FIG. 4D, switch 43 is opened and switch 42 is simultaneously closed and current is again delivered to the transformer. The sequence is then repeated 4A, 4B, 4C, 4D, 4A, etc. The ratio of switch 43 "on" time to switch 41 and 42 "on" times controls the energy transferred. The transformer turns ratio is such that the battery cannot be charged from the utility grid under normal conditions without the boost circuit. The selection of switch 41 verses 42 is selected based on the instantaneous AC line polarity. In this battery charging mode, switch 43 provides a boost regulator function and switch pairs 21, 23 and 22, 24 operate as synchronous rectifiers. FIG. 5 illustrates two AC ports configured for interface to a split-phase utility or to deliver power to split-phase loads. FIG. 6 illustrates one method for configuring a switch element with the required characteristics for use as switches 41, 42 and 43 as reference-din FIG. 1. Terminals 11 and 12 are the switch poles. The two terminals are interchangeable with respect to any polarity reference. MOSFETs 7 and 8 are connected in a common source configuration so that voltage can be blocked in either direction and current flow can be controlled in either direction. Gate driver 4 drives MOSFETS 7 and 8 through resistors 5 and 6 respectively. MOSFETs 7 and 8 are switched simultaneously. The Vcc 2 to Vss 3 power supply and the logic drive signal 1 are electrically isolated from the other switch elements in a typical power converter. A number of MOSFET devices may be paralleled so that the conduction voltage drop of the MOSFET is always lower than the conduction voltage of the MOSFET parasitic diode. As such, current never flows through the MOSFET parasitic diodes. The configuration shown in FIG. 6 is known. FIG. 7 illustrates a second method for configuring a switch element with the required characteristics for use as switches 41, 42 and 43 in FIG. 1. The method is essentially the same as shown in FIG. 6 except that Insulated Gate Bipolar Transistors (IGBTs) are used in place of FETs. This logical extension is obvious and therefore considered known by default. FIG. 8 illustrates a hybrid switch that incorporates the best features of both the MOSFET and IGBT bi-directional switches and is the preferred method for configuring a switch element with the required characteristics for use as switches 41, 42 and 43 in FIG. 1. Terminals 13 and 14 are the switch poles. The two terminals are interchangeable with respect to any polarity reference. IGBTs 9 and 10 are connected in a common emitter configuration and each are connected in parallel with MOSFETs 11 and 12 respectively. Voltage can be blocked in either direction and current flow can be controlled in either direction. Gate driver 4 drives all semiconductor devices through gate resistors 5–8. The Vcc 2 to Vss 3 power supply and the logic drive signal 1 are electrically isolated. In higher voltage applications, the hybrid switch illustrated in FIG. 8 operates with lower losses over a wider range of currents than either the MOSFET only or the IGBT only bi-directional switch. MOSFET devices exhibit a resistive "on" characteristic while IGBT devices exhibit a semiconductor junction "on" characteristic. In the AC port application discussed, the IGBT devices handle the high peak currents more cost effectively than the MOSFET devices. High peak currents are shunted from the MOSFETS by the IGBTs. At lower currents, the current is shunted from the IGBTs and parasitic MOSFET diodes by a MOSFET "on" resistance that represents a lower voltage drop than the semiconductor "on" voltage. Additionally, if separate drivers are used for the IGBTs and the MOSFETs, the MOSFET turnoff can be delayed with respect to the IGBT turnoff to take advantage of the faster MOSFET switching speeds. This bi-directional hybrid switch is novel and is part of this invention.

The invention claimed is:

[1. A power converter apparatus comprising three or more ports, a transformer and a control circuit where one end of each port is connected to a distinct winding on a common transformer core and where the remaining end of each port is connected to a load or power source and where each port comprises an arrangement of capacitive or inductive energy storage elements and semiconductor switches where individual semiconductor switches are commanded on and off by said control circuit in a synchronous manner with semiconductor switches in other ports and where said power converter apparatus is further defined, as having one port dedicated to a storage battery, designated for reference herein as the battery port, having characteristics different from all other ports, specifically, semiconductor switches in the battery port operate in a free-running mode and provide frequency and phase references that are followed by synchronous switches in all remaining ports and the interface at the battery port transformer winding is that of a low impedance AC voltage source or sink, whereas the interface at the transformer windings of all other ports is that of a high impedance AC current source or sink and where these two distinct port types, battery and non-battery, enable energy transfer into or out of all non-battery ports simultaneously and in an autonomous manner in terms of energy transfer and where the net energy into or out of all non-battery ports charges or discharges the storage battery, respectively, via the battery port.]

*2. A power conversion method using a transformer comprising a first winding, a second winding, and a third winding, a first switching circuit coupled to the first winding and to first terminals coupled to a photovoltaic array, the first switching circuit including a buck regulator providing unidirectional energy flow from the photovoltaic array to the transformer, a second switching circuit coupled to the second winding and to second terminals for connection to a battery, and a third switching circuit coupled to the third winding and to third terminals for connection to an AC power source connected to a utility grid or to a load, the method comprising:*

*controlling the first, second and third switching circuits by switching the first, second and third switching circuits at a frequency much greater than a frequency of the utility grid such that at least some of the time, the first, second, and third switching circuits are all active, with switching*

*of the first, second and third switching circuits being synchronized with respect to each other and such that when the second switching circuit is active to provide energy from the battery, a voltage across the battery is provided to the second winding; and*

*selectively activating the buck regulator to cause unidirectional energy to flow from the photovoltaic array to the transformer such that when the first switching circuit is active no energy flows from the transformer back to the photovoltaic array, wherein the buck regulator includes a capacitor and a parallel-connected diode connected across the photovoltaic array, a unidirectional semiconductor switch, and an inductor connected in series with the first winding, wherein the selectively activating causes current from the photovoltaic array to be converted to a corresponding voltage at the capacitor of the buck regulator and then converted to a corresponding current via the inductor of the buck regulator and provided to the first winding.*

*3. The power conversion method of claim 2, comprising switching the third switching circuit in accordance with a varying duty cycle so as to produce a line-frequency power waveform.*

*4. The power conversion method of claim 2, comprising controlling the first switching circuit so as to supply power to the transformer.*

*5. The power conversion method of claim 2, comprising controlling the second switching circuit so as to, at one time, supply power to the transformer and to, at another time, be supplied power from the transformer.*

*6. The power conversion system of claim 2, comprising controlling the third switching circuit so as to perform boost regulation.*

*7. The power conversion method of claim 2, comprising controlling the third switching circuit so as to, at one time, supply power to the transformer and to, at another time, be supplied power from the transformer.*

*8. The power conversion method of claim 2, comprising coupling the battery coupled to the second terminals.*

*9. The power conversion method of claim 2, comprising coupling the third terminals to the load or to the utility grid.*

*10. The power conversion method of claim 2, wherein the frequency of the switching of the first, second and third switching circuits is at an ultrasonic frequency or greater.*

* * * * *